Dec. 3, 1940.     H. V. PUTMAN     2,223,530
PROTECTIVE DEVICE FOR ELECTRICAL APPARATUS
Filed July 21, 1936     2 Sheets-Sheet 1
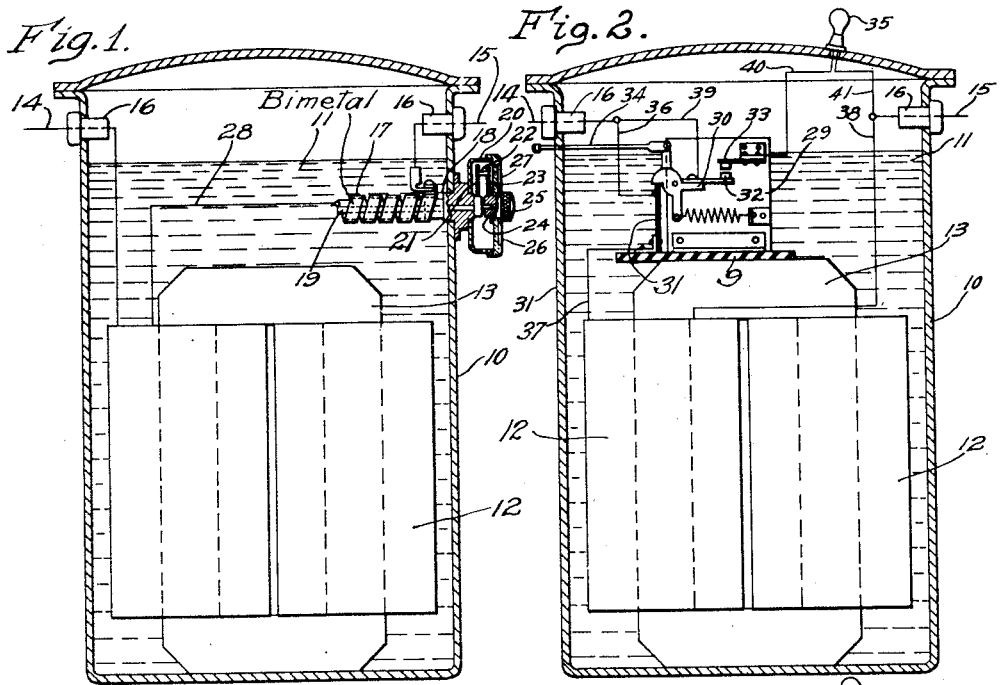
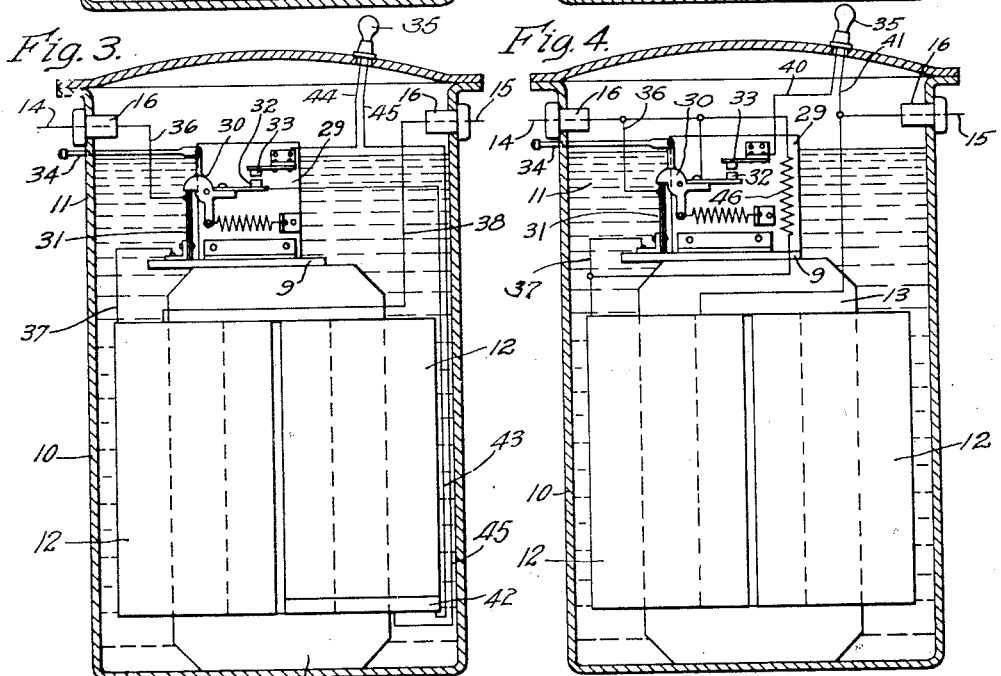
WITNESSES:
C. J. Weller.
Nw. C. Groome
INVENTOR
Henry V. Putman.
BY Ezra W. Savage
ATTORNEY

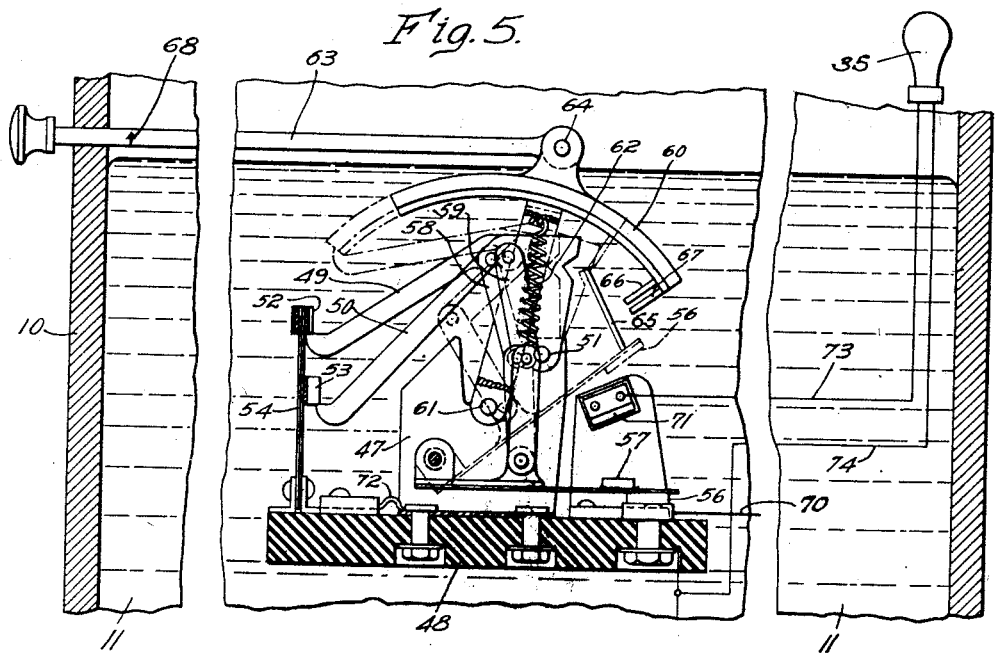
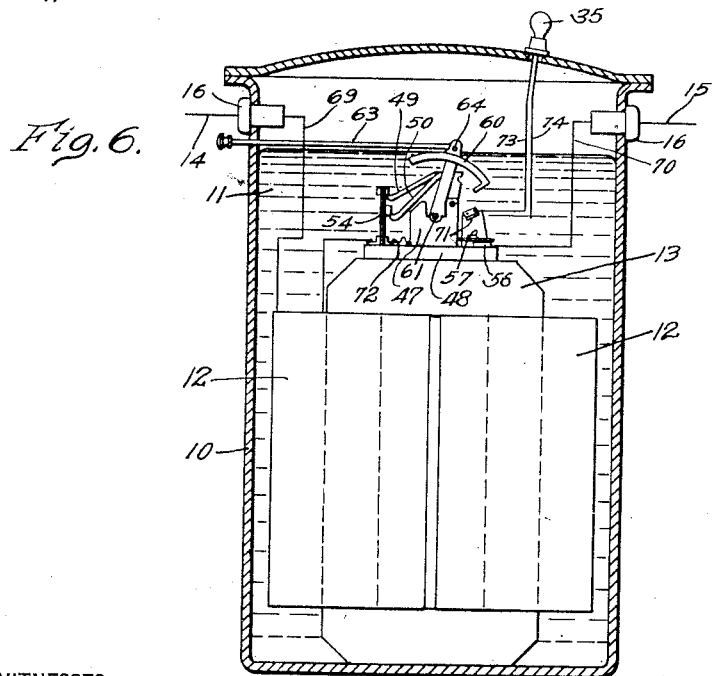

Patented Dec. 3, 1940

2,223,530

UNITED STATES PATENT OFFICE 2,223,530

PROTECTIVE DEVICE FOR ELECTRICAL APPARATUS

Henry V. Putman, Sharon, Pa., assignor to Westinghouse Electric & Manufacturing Company, East Pittsburgh, Pa., a corporation of Pennsylvania Application July 21, 1936, Serial No. 91,654

19 Claims. (Cl. 177—311)

The invention relates generally to protective devices for electrical apparatus and more particularly to protective devices for transformers.

In distribution systems, electrical apparatus, such as transformers, regulators, etc., are often located in places remote from the central power stations. In such installations, transformers and other apparatus operate for months without inspection because of the difficulty and cost of making inspections which will give useful information on load conditions.

Heretofore the inspection or testing of transformers and other electrical apparatus to ascertain whether or not overload conditions prevailed required experienced, highly paid men. When such inspections and tests are made regularly, the cost of operation is greatly increased, and if neglected, failure of the apparatus due to overloading with expensive interruptions of service may result.

The object of this invention is to provide for indicating predetermined operating conditions in electrical apparatus.

It is also an object of the invention to provide for facilitating the inspection of electrical apparatus in distribution systems to maintain safe operating conditions.

Other objects of the invention will in part be obvious and in part appear hereinafter.

The invention accordingly is disclosed in the accompanying drawings and comprises the features of construction, combination of elements and arrangement of parts, which will be exemplified in the structure hereinafter set forth and the scope of the application of which will be indicated in the claims.

For a fuller understanding of the object of the invention, reference may be had to the following detailed description taken in connection with the accompanying drawings, in which:

Figure 1 is a view partly in section and partly in side elevation of a transformer showing protective apparatus applied thereto in accordance with the teachings of this invention;

Fig. 2 is a view partly in section and partly in side elevation of a transformer showing a modification of the protective apparatus illustrated in Fig. 1;

Fig. 3 is a view partly in section and partly in side elevation of a transformer showing another modification of the protective apparatus;

Fig. 4 is a view partly in section and partly in side elevation of a further modification of the protective apparatus applied to a transformer;

Fig. 5 is a view partly in section and partly in side elevation of a portion of the protective apparatus showing details of its construction; and Fig. 6 is a view partly in section and partly in side elevation showing the apparatus illustrated in Fig. 5 applied to a transformer.

Referring now to the drawings and Fig. 1 in particular, a transformer case 10 is illustrated as partly filled with a suitable dielectric 11. A sufficient quantity of dielectric liquid is employed to completely immerse the transformer coils 12 and the core 13. In this particular construction, the transformer leads 14 and 15 are taken through the wall of the transformer case 10 by means of bushings 16.

In the operation of transformers, it is desirable to protect them from overload conditions of all kinds. Under some operating conditions, a transformer may be subjected to a gradually increasing load which develops into a continuous overload. If the load is increased slowly and gradually, the temperature of the oil or other dielectric in the transformer follows closely the temperature of the coils or copper. Under other operating conditions a transformer may be overloaded because of a sudden rush of current caused by some abnormal condition such as a short circuit. When an overload of this kind occurs, the copper temperature rises much more quickly than the oil temperature, and in order to protect the transformer against burnouts resulting from either continuous overloads or short circuits, means must be provided which responds to the copper temperature and functions to indicate that a predetermined copper temperature has been reached or to effect the operation of some suitable protective device.

In the present invention, in order to protect a transformer, a bimetal strip or member, the function of which will be described hereinafter, is employed and connected in series circuit relation to carry all or a portion of the current. In mounting the bimetal element, it is immersed in the dielectric provided for the coils and thereby subjected to all the changes in temperature of the dielectric.

From the foregoing description, it will be evident that the bimetal element employed is affected by both the temperature of the dielectric and the temperature gradient at the surface of the metal which is a function of the square of the current. Further the bimetal element may be designed to have substantially the same temperature gradient characteristic as the copper, or other insulated electrical conductor, of the coils. Therefore, upon changes in the load current, the temperature and movement of the bimetal element may be made to follow approximately the changes in the temperature of the copper of the transformer coils.

In Fig. 1, a spirally wound bimetal member 17 is shown connected to a plug 18 tightly mounted in the wall of the transformer case 10. The inner end of the bimetal spiral is mechanically connected to the inner end of a shaft 19 which is rotatively mounted in an opening provided in the plug 18. As shown, the plug 18 is provided with flanges which seat on the wall of the case 10 making a tight joint to prevent the dielectric from escaping.

The shaft 19 extends into a case 20 carried by the plug 18. The case 20 is provided with a glass front, as illustrated. An indicating hand 21 is keyed to the shaft 19, and has a projection 22 provided thereon for engaging a second indicating hand 23.

As illustrated, the second indicating hand 23 is rotatively mounted on a friction drum 24 to which a knob 25 is attached. The drum 24 is rotatively mounted in the outer wall 26 of the case 20 to provide for resetting the hand 23. An opening 27 is provided in the case 20 to enable an inspection of the hands 21 and 23 through the glass front.

In operation, when the transformer is connected into a distribution system, a circuit is established which may be traced from the lead 14 through the transformer coils 12, the transformer lead 28, the spiral bimetal member 17 to the lead 15.

The bimetal element 17 is subjected to the heating caused by the flow of electric current and the dielectric 11. If the transformer is loaded slowly and gradually the dielectric will heat at substantially the same rate as the coils. When heated the bimetal element gradually straightens out and rotates the shaft 19, which in turn moves the hands 21 and 23.

Assuming now that the transformer is overloaded either by a sudden rush of current or a slow gradual building up of a load, then the bimetal element is heated and the shaft 19 actuates the hand 21 and rotates the hand 23 on the drum 24. Since the hand 23 makes a tight frictional engagement with the drum 24, it will be retained in the position to which it may be actuated by the hand 21. In this manner, an indication of the maximum temperature to which the transformer has been heated is recorded. An inspector in making rounds may readily determine the temperature to which the transformer has been heated from the position of the hand 23.

If the hand 23 indicates that the transformer has been overloaded, it is a warning that it has not sufficient capacity for the load in that section of the system, and depending upon the extent of the overload, a decision may be arrived at as to whether or not the transformer should be changed for one of greater capacity. If the transformer has been seriously overloaded, it is advisable to change it immediately to avoid interruptions in service.

The modification illustrated in Fig. 2 comprises a frame or plate 29 disposed on the iron 13 of the transformer. It is preferable to insulate the frame from the iron core by a plate 9 of some suitable insulating material such for example as Micarta. A spring biased latch 30 is pivotally mounted on the frame 29, and disposed to be retained in a predetermined position by a bimetal strip 31.

As shown, a contact member 32 is carried by the latch 30. A fixed contact member 33 mounted on the frame 29 is disposed to receive the contact member 32 provided on the spring biased latch 30.

In order to reset the latch 30 a rod 34 is provided which extends through the transformer case 10. A reset rod 34 is shown to facilitate illustration. However, any other suitable means well known in the art, such as electromagnetic control apparatus may be utilized.

An electric signal lamp 35 is disposed on the outside of the transformer case 10 and connected across the transformer coils through the bimetal strip 31 and contact members 32 and 33.

When the transformer is in operation, a circuit is established from the lead 14 through conductor 36, the bimetal strip 31, conductor 37, the coils 12 of the transformer and conductor 38 to the lead 15. Assuming that the transformer temperature increases to a predetermined value as a result of overload conditions, then the bimetal strip 31 which is designed to respond to a selected temperature release the pivoted spring-biased latch 30 and the contact member 32 is actuated into engagement with the contact member 33, establishing a circuit which may be traced as follows— from the energized lead 14 through conductor 39, contact members 32 and 33, conductor 40 through the signal lamp 35 and conductor 41 to the lead 15.

In this manner, the lamp 35 is connected across the transformer coils and a signal is established to indicate that the transformer has been heated to a predetermined temperature, indicating overload conditions.

An inspector can readily see the light from the ground in case the transformer is in an inaccessible place, and can report the condition existing. It is not necessary to have a trained inspector for making such inspections, but any one living in the community can be employed for such purpose, thus facilitating the patrolling of the system. This is of particular value in rural distribution systems.

The modification shown in Fig. 3 is the same as the modification shown in Fig. 2, with the exception that an independent coil 42 is provided for the signal lamp 35. This coil 42 comprises a few turns of a suitable conductor wound on one leg of the core 13.

The description of the structure and operation given for Fig. 2 will apply to Fig. 3 with the exception of the circuit traced. In the operation of the apparatus disclosed in Fig. 3, the internal transformer circuit extends from the lead 14 through conductor 36, the bimetal strip 31, conductor 37, the transformer coils 12, and conductor 38 to the lead 15.

Assuming that the transformer is overloaded causing an increase in temperature, then the bimetal which responds to the current flowing and the temperature of the dielectric is actuated to release the spring-biased pivoted latch 30, establishing a signal lamp circuit which may be traced from one terminal of the coil 42, through conductor 43, the contact member 32 carried by the spring biased latch 30, stationary contact member 33 carried by the frame 29, conductor 44, lamp 35 and conductor 45 back to the other terminal of the coil 42. The lighting of the lamp 35 indicates overload conditions.

The modification illustrated in Fig. 4 is similar to the modification disclosed in Fig. 2 with the exception that a shunt 46 is connected across the bimetal strip 31. The provision of the shunt 46 permits the use of the apparatus for signalling overload conditions with all sizes of transformers or other electrical apparatus. In case the electrical apparatus for signalling load conditions is designed for carrying (x) amperes and it is desired to utilize it with apparatus carrying 5x amperes, then a shunt which will carry 4x amperes is connected across the bimetal. This facilitates the adapting of the signalling apparatus to transformers or other electrical apparatus of any predetermined capacity.

In Figs. 5 and 6 a circuit interrupter controlled by a specially designed thermostat is utilized for respectively establishing the signalling circuit and interrupting the transformer circuit when different predetermined operating conditions are established. Many different types of the means for interrupting the transformer circuit may be employed, such for example as the breaker disclosed in a patent to M. G. Leonard, No. 2,169,586, granted August 15, 1939, and assigned to the Westinghouse Electric & Manufacturing Company. Since this breaker is described in great detail in this copending application, it will not be described in detail.

The breaker illustrated in Figs. 5 and 6 performs two functions. It controls the signalling circuit and the transformer circuit. These functions may be performed independently, that is, the circuit interrupter may be actuated to establish the signalling circuit independently without interrupting the transformer circuit.

As illustrated in Fig. 5, the circuit interrupter is mounted on a base 48 of Micarta or other suitable insulating material. Two independent latch members 49 and 50 are pivotally mounted on a shaft 51 carried by the frame 47. The latch members 49 and 50 are shaped to engage blocks or shoulder members 52 and 53, respectively, carried by the bimetal strip 54. These blocks 52 and 53 are insulated from the bimetal strip for a reason that will appear hereinafter.

The bimetal strip is of the well known U-shaped type and is disposed to swing away from the latch members upon a predetermined increase in temperature. As will be observed by reference to Fig. 5, a very small movement of the bimetal strip 54 counterclockwise will effect a release of the latch 50. In order to release the latch 49 from the block 52, a much longer movement of the bimetal strip 54 is required. The length of movement of the bimetal strip 54 will depend on the temperatures to which it may be subjected. Therefore, provisions may be made for tripping the latches 49 and 50 at any predetermined temperatures. The temperature to which the bimetal is raised will depend on both the current flowing in the transformer circuit and the temperature of the dielectric 11. As previously pointed out, the bimetal really operates in response to a function of the temperature of the copper of the transformer coils, which is a true measure of the severity of the load conditions to which the transformer is subjected.

As shown in Fig. 5, pivotally mounted contact members 56 and 57 are provided in conjunction with the latches 49 and 50, respectively. The pivotally mounted contact member 56 is connected to the latch 49 by a toggle linkage 58 while the pivotally mounted contact member 57 is connected to the latch 50 by a toggle linkage 59. An actuating or resetting member 60 which is pivoted on the frame at 61 is connected to the pivot point of the linkages by a plurality of springs 62. In this manner the latches and pivotally mounted contact members are disposed to be actuated in the manner of spring biased toggle switches. In order to provide for the operation of the actuating member 60, a pull rod 63 is provided. As shown the pull rod extends through the wall of the transformer case 10 and is pivotally connected at 64 to the actuating member 60.

As shown in Fig. 5, a stop 65 is provided for receiving the latch members 49 and 50 when released. This stop is also utilized to limit the movement of the pivotally mounted contact member 56.

Two inwardly extending projections 66 and 67 are provided on the actuating member 60 to engage the latches 49 and 50, respectively, for resetting them. These projections 66 and 67 are shown disposed in advance of one another but such an arrangement is not essential.

Assuming now that the latches are in the position illustrated in Fig. 5 and that the bimetal element is heated to a temperature which causes it to move counter-clockwise and release latch 50, the release of latch 50, as will be disclosed hereinafter, connects the signal light 35 across the transformer, indicating that the temperature rise in the transformer has reached a predetermined value. When this condition has been observed, the inspector will report the conditions under which the transformer is operating and steps may be taken to substitute a transformer of the required capacity.

When this report has been made, it is not desired that the signal lamp shall remain lighted. Accordingly, the inspector will operate the resetting member 60 to reset the latch 50. This may be accomplished by operating the pull rod 63 a predetermined distance, that is, the operator will pull the rod 63 outwardly until the mark 68 appears. The rod 63 is then pushed in again and the circuit breaker will thus be set in position to operate once more in response to the development of predetermined temperature conditions of the bimetallic element 54.

Referring now to Fig. 6, the operating circuits will be described. When the latches 49 and 50 of the circuit interrupter stand in the position illustrated in Fig. 5, the internal transformer circuit may be traced from lead 14 through conductor 69, the coils 12 of the transformer, the U-shaped bimetal strip 54, the frame 50 of the interrupter and conductor 70 to the lead 15.

Assuming now that there is a temperature rise in the transformer and that the latch 50 is released, and that the pivotally mounted contact member 57 is drawn upwardly into engagement with the contact member 71 carried by the frame 47, then a circuit is established which may be traced from conductor 72, through the pivotally mounted contact carrying arm 57 to the contact member 71, conductor 73, a signal lamp 35, and conductors 74 to a suitable source of lamp-voltage within the transformer.

When both latches 49 and 50 are tripped, the pivotally mounted contact members 56 and 57 are released, the latch 49 serving to interrupt the transformer circuit, and the latch 50 serving to establish a signal circuit. The bimetal strip 54 is so designed that the tripping latch 49 is tripped when the transformer is overloaded beyond its rated overload capacity. When either the first latch 50 or both latches are tripped, it or they can be reset by pulling the actuating member 60 to the left by means of the pull-rod 63. Both latches may be readily reset in this manner by forcing one beyond its latching position and allowing it to come back after the other latch has been caught on its corresponding block.

In addition to the structures described, a shunt such as 46 shown in Fig. 4, or a separate lamp energizing coil 42 illustrated in Fig. 3 may be employed with the circuit interrupter disclosed in Figs. 5 and 6.

The combined circuit-breaker and signal-lamp operator which is shown in Figs. 5 and 6 is claimed per se in my divisional application Serial No. 254,613, filed February 4, 1939. The combination of a thermally responsive circuit-breaker with a transformer, without the auxiliary thermally responsive signal-lamp, constitutes the subject-matter of an earlier-filed application of J. K. Hodnette, Serial No. 688,803, filed September 9, 1933, now Patent No. 2,066,935, granted January 5, 1937 and assigned to the same assignee as the present application.

In conclusion, it is pointed out that while the illustrated examples constitute practical embodiments of my invention, I do not limit myself to the exact details shown, since the modifications of the same may be considerably varied without departing from the spirit of the invention as defined in the appended claims.

I claim as my invention:

1. In a transformer provided with coils immersed in a liquid dielectric, in combination, a bimetal element immersed in the dielectric and connected in series circuit relation with respect to the coils, the bimetal element thereby being exposed to both the temperature of the dielectric and heating caused by the flow of electric current, the bimetal element being so proportioned, as to its resistance and as to its heat-exchanging relation to the liquid dielectric, as to produce a cumulative heating approximating a proportionate temperature-gradient characteristic as compared to that of an electrical conductor of the coils, whereby said bimetal element will indicate approximately when an undesirably high temperature-condition has been reached in the coils as a result of various degrees of overloading for various lengths of time, a signaling circuit, and means disposed to operate upon the actuation of the bimetal element to close the signaling circuit and lock it closed, to indicate predetermined operating conditions.

2. In a transformer provided with coils immersed in a liquid dielectric, a bimetal element immersed in the dielectric and connected in series circuit relation with respect to the coils, the bimetal element thereby being subjected to the temperature of the oil and the heating caused by the flow of electric current, the bimetal element being so proportioned, as to its resistance and as to its heat-exchanging relation to the liquid dielectric, as to produce a cumulative heating approximating a proportionate temperature-gradient characteristic as compared to that of an electrical conductor of the coils, whereby said bimetal element will indicate approximately when an undesirably high temperature-condition has been reached in the coils as a result of various degrees of overloading for various lengths of time, a signal lamp, means for supplying current to the signal lamp, and means disposed to operate on a predetermined movement of the bimetal element to connect the signal lamp across the means for supplying current, and to thereafter maintain such connection independently of the position of the bimetal element, to indicate operating conditions.

3. In a transformer provided with coils immersed in a liquid dielectric, in combination, a circuit interrupter, a bimetal element for controlling the operation of the circuit interrupter, the bimetal element being immersed in the dielectric and connected in series circuit relation with respect to the coils to respond to the current flowing and the temperature of the dielectric, the bimetal element being so proportioned, as to its resistance and as to its heat-exchanging relation to the liquid dielectric, as to produce a cumulative heating approximating a proportionate temperature-gradient characteristic as compared to that of an electrical conductor of the coils, whereby said bimetal element will indicate approximately when an undesirably high temperature-condition has been reached in the coils as a result of various degrees of overloading for various lengths of time, a signal means disposed to be actuated by the bimetal element whereby a locked-in signal is given when the bimetal element has reached a predetermined temperature, and means actuated by the interrupter to open the circuit through the coils when the bimetal element reaches a higher predetermined temperature.

4. In combination, an electrical transformer comprising a container, a liquid dielectric therein, current-carrying, insulated electrical-conductor coils immersed in said dielectric, thermally responsive means, means for causing said thermally responsive means to be heated jointly in response to a current in said coils and in response to the temperature of said dielectric in such proportions as to produce a cumulative heating approximating a proportionate temperature-gradient characteristic as compared to that of an electrical conductor of the coils, whereby said thermally responsive means will indicate approximately when an undesirably high temperature-condition has been reached in the coils as a result of various degrees of overloading for various lengths of time, and self-locking means visible exteriorly of the container for indicating a maximum-temperature indication of said thermally responsive means while said electrical transformer is in useful operation.

5. In combination, an electrical transformer comprising a container, a liquid dielectric therein, current-carrying, insulated electrical-conductor coils immersed in said dielectric, thermally responsive means, means for causing said thermally responsive means to be heated jointly in response to a current in said coils and in response to the temperature of said dielectric in such proportions as to produce a cumulative heating approximating a proportionate temperature-gradient characteristic as compared to that of an electrical conductor of the coils, whereby said thermally responsive means will indicate approximately when an undesirably high temperature-condition has been reached in the coils as a result of various degrees of overloading for various lengths of time, a signaling circuit, and circuit-make-and-break means disposed to operate in response to the thermally responsive means to control the signaling circuit so as to indicate undesirably high temperature-conditions during the useful operation of said electrical transformer, the signal circuit being of a lock-in type capable of remaining set when once so controlled.

6. In combination, an electrical transformer comprising a container, a liquid dielectric therein, current-carrying, insulated electrical-conductor coils immersed in said dielectric, thermally responsive means, means for causing said thermally responsive means to be heated jointly in response to a current in said coils and in response to the temperature of said dielectric in such proportions as to produce a cumulative heating approximating a proportionate temperature-gradient characteristic as compared to that of an electrical conductor of the coils, whereby said thermally responsive means will indicate approximately when an undesirably high temperature-condition has been reached in the coils as a result of various degrees of overloading for various lengths of time, and means visible exteriorly of the container for indicating, during the continuance of the useful operation of said electrical transformer, that the electrical conductor of the coils has, on at least one occasion, reached an undesirably high temperature-condition during the operating conditions previously existing on the electrical transformer.

7. In combination, an electrical transformer comprising a container, a liquid dielectric therein, current-carrying, insulated electrical-conductor coils immersed in said dielectric, thermally responsive means, means for causing said thermally responsive means to be heated jointly in response to a current in said coils and in response to the temperature of said dielectric in such proportions as to produce a cumulative heating approximating a proportionate temperature-gradient characteristic as compared to that of an electrical conductor of the coils, whereby said thermally responsive means will indicate approximately when an undesirably high temperature-condition has been reached in the coils as a result of various degrees of overloading for various lengths of time, self-locking means visible exteriorly of the container for indicating a maximum-temperature indication of said thermally responsive means while said electrical transformer is in useful operation, and circuit-interrupting means responsive to an extremely high temperature-condition of said thermally responsive means for disconnecting said electrical transformer from useful operation and thereby protecting the same against burnouts resulting from continuous overloads or short circuits.

8. In combination, an electrical transformer comprising a container, a liquid dielectric therein, current-carrying, insulated electrical-conductor coils immersed in said dielectric, thermally responsive means, means for causing said thermally responsive means to be heated jointly in response to a current in said coils and in response to the temperature of said dielectric in such proportions as to produce a cumulative heating approximating a proportionate temperature-gradient characteristic as compared to that of an electrical conductor of the coils, whereby said thermally responsive means will indicate approximately when an undesirably high temperature-condition has been reached in the coils as a result of various degrees of overloading for various lengths of time, a signaling circuit, circuit-make-and-break means disposed to operate in response to the thermally responsive means to control the signaling circuit so as to indicate undesirably high temperature-conditions during the useful operation of said electrical transformer, the signal circuit being of a lock-in type capable of remaining set when once so controlled, and circuit-interrupting means responsive to an extremely high temperature-condition of said thermally responsive means for disconnecting said electrical transformer from useful operation and thereby protecting the same against burnouts resulting from continuous overloads or short circuits.

9. In combination, an electrical transformer comprising a container, a liquid dielectric therein, current-carrying, insulated electrical-conductor coils immersed in said dielectric, thermally responsive means, means for causing said thermally responsive means to be heated jointly in response to a current in said coils and in response to the temperature of said dielectric in such proportions as to produce a cumulative heating approximating a proportionate temperature-gradient characteristic as compared to that of an electrical conductor of the coils, whereby said thermally responsive means will indicate approximately when an undesirably high temperature-condition has been reached in the coils as a result of various degrees of overloading for various lengths of time, means visible exteriorly of the container for indicating, during the continuance of the useful operation of said electrical transformer, that the electrical conductor of the coils has, on at least one occasion, reached an undesirably high temperature-condition during the operating conditions previously existing on the electrical transformer, and circuit-interrupting means responsive to an extremely high temperature-condition of said thermally responsive means for disconnecting said electrical transformer from useful operation and thereby protecting the same against burnouts resulting from continuous overloads or short circuits.

10. An organization including a transformer adapted to be mounted in an inaccessible place, and comprising a tank, oil therein, insulated electrical windings immersed in said oil whereby said windings are heated by the electric current which they carry and are cooled by the oil, a signal-means capable of being actuated so as to be visible from an accessible place, said signal-means being of a lock-in type capable of remaining set when once actuated, and thermally-responsive means for actuating said signal-means, said thermally-responsive means including a thermal element, means incorporated in said organization for causing said thermal element to be heated responsively to a current flowing through the transformer windings, and means for mounting said thermal element in heat-exchanging relation with respect to said oil, the thermal element being so proportioned, as to its heating in response to the current and as to its heat-exchanging relation to the oil, as to produce a cumulative heating approximating a proportionate temperature-gradient characteristic as compared to that of an electrical conductor of the windings, whereby said thermal element will indicate approximately when an undesirably high temperature-condition has been reached in the windings as a result of various degrees of overloading for various lengths of time, and whereby said thermally-responsive means is capable of affording a signal-actuating response to an undesirable internal-temperature condition of the transformer windings.

11. An organization including a transformer adapted to be mounted in an inaccessible place, and comprising a tank, oil therein, insulated electrical windings immersed in said oil whereby said windings are heated by the electric current which they carry and are cooled by the oil, a signal-means capable of being actuated so as to be visible from an accessible place, said signal-means being of a lock-in type capable of remaining set when once actuated, electrical-contact means capable, when actuated, of opening a circuit of the transformer windings, and thermally-responsive means for selectively actuating first said signal-means and subsequently said electrical-contact means at successively higher internal-temperature conditions within the transformer, said thermally-responsive means including a thermal element, means incorporated in said organization for causing said thermal element to be heated responsively to a current flowing through the transformer windings, and means for mounting said thermal element in heat-exchanging relation with respect to said oil, the thermal element being so proportioned, as to its heating in response to the current and as to its heat-exchanging relation to the oil, as to produce a cumulative heating approximating a proportionate temperature-gradient characteristic as compared to that of an electrical conductor of the windings, whereby said thermal element will indicate approximately when an undesirably high temperature-condition has been reached in the windings as a result of various degrees of overloading for various lengths of time, and whereby said thermally-responsive means is capable of affording signal-actuating and contact-actuating responses to undesirable internal-temperature conditions of the transformer windings.

12. An organization including, in combination, a transformer comprising a tank, oil therein, insulated electrical windings immersed in said oil whereby said windings are heated by the electric current which they carry and are cooled by the oil, a temperature-responsive element disposed in heat-transfer relation to said oil so as to be heated or cooled by the oil, means incorporated in said organization for also directly heating the temperature-responsive element in response to the load-current of the transformer, the temperature-responsive element being so proportioned, as to its heating in response to the load-current and as to its heat-transfer relation to the oil, as to produce a cumulative heating approximating a proportionate temperature-gradient characteristic as compared to that of an electrical conductor of the windings, whereby said temperature-responsive element will indicate approximately when an undesirably high temperature-condition has been reached in the windings as a result of various degrees of overloading for various lengths of time, an auxiliary circuit-controlling device of a self-locking type disposed within said transformer-tank, means for actuating said auxiliary circuit-controlling device in response to a predetermined response of said temperature-responsive element so as to cause said auxiliary circuit-controlling device to lock itself in its actuated condition, an electric lamp mounted to be visible externally of the transformer-tank, electric-circuit means, including said auxiliary circuit-controlling device, for lighting said lamp when said auxiliary circuit-controlling device is actuated, and resetting-means, accessible from outside of the tank, for unlocking and resetting said auxiliary circuit-controlling device.

13. The invention as defined in claim 12, in combination with a load-current circuit-controlling device connected in series with a load-current circuit of the transformer in such manner as to interrupt said load-current when said load-current circuit-controlling device is actuated, said load-current circuit-controlling device being of a self-locking type which locks itself in its actuated condition, and means responsive to a predetermined response of said temperature-responsive element for actuating said load-circuit current-controlling device, said last-mentioned predetermined response corresponding to higher temperature-conditions than those which brought about an actuation of said auxiliary circuit-controlling device.

14. In combination, an electrical transformer comprising a container, a liquid dielectric therein, current-carrying, insulated electrical-conductor coils immersed in said dielectric, control-means, means for causing said control-means to be actuated jointly in response to a current in said coils and in response to the temperature of said dielectric in such proportions as to produce a cumulative response approximating the temperature-gradient characteristic of an electrical conductor of the coils, whereby said control-means will indicate approximately when an undesirably high temperature-condition has been reached in the coils as a result of various degrees of overloading for various lengths of time, and self-locking means visible exteriorly of the container for indicating a maximum-temperature indication of said control-means while said electrical transformer is in useful operation.

15. In combination, an electrical transformer comprising a container, a liquid dielectric therein, current-carrying, insulated electrical-conductor coils immersed in said dielectric, control-means, means for causing said control-means to be actuated jointly in response to a current in said coils and in response to the temperature of said dielectric in such proportions as to produce a cumulative response approximating the temperature-gradient characteristic of an electrical conductor of the coils, whereby said control-means will indicate approximately when an undesirably high temperature-condition has been reached in the coils as a result of various degrees of overloading for various lengths of time, a signalling circuit, and circuit-make-and-break means disposed to operate in response to said control-means to control the signalling circuit so as to indicate undesirably high temperature-conditions during the useful operation of said electrical transformer, the signal circuit being of a lock-in type capable of remaining set when once so controlled.

16. In combination, an electrical transformer comprising a container, a liquid dielectric therein, current-carrying, insulated electrical-conductor coils immersed in said dielectric, control-means, means for causing said control-means to be actuated jointly in response to a current in said coils and in response to the temperature of said dielectric in such proportions as to produce a cumulative response approximating the temperature-gradient characteristics of an electrical conductor of the coils, whereby said control-means will indicate approximately when an undesirably high temperature-condition has been reached in the coils as a result of various degrees of overloading for various lengths of time, and means visible exteriorly of the container for indicating, during the continuance of the useful operation of said electrical transformer, that the electrical conductor of the coils has, on at least one occasion, reached an undesirably high temperature-condition during the operating conditions previously existing on the electrical transformer.

17. The invention as defined in claim 14, in combination with circuit-interrupting means responsive to an extremely large response of said control-means for disconnecting said electrical transformer from useful operation and thereby protecting the same against burnouts resulting from continuous overloads or short circuits.

18. The invention as defined in claim 15, in combination with circuit-interrupting means responsive to an extremely large response of said control-means for disconnecting said electrical transformer from useful operation and thereby protecting the same against burnouts resulting from continuous overloads or short circuits.

19. The invention as defined in claim 16, in combination with circuit-interrupting means responsive to an extremely large response of said control-means for disconnecting said electrical transformer from useful operation and thereby protecting the same against burnouts resulting from continuous overloads or short circuits.

HENRY V. PUTMAN.